Nov. 7, 1939.　　　　G. WEISE　　　　2,179,070
COLLAPSIBLE TOW BAR
Filed Jan. 27, 1939　　2 Sheets-Sheet 2
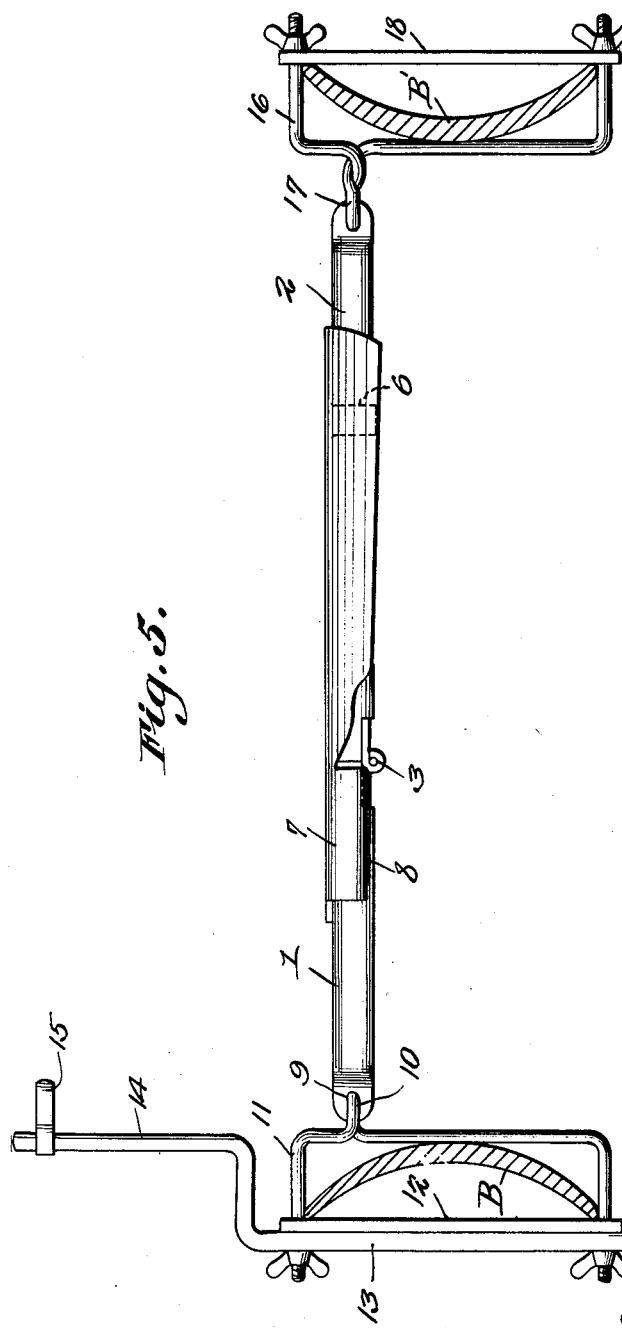
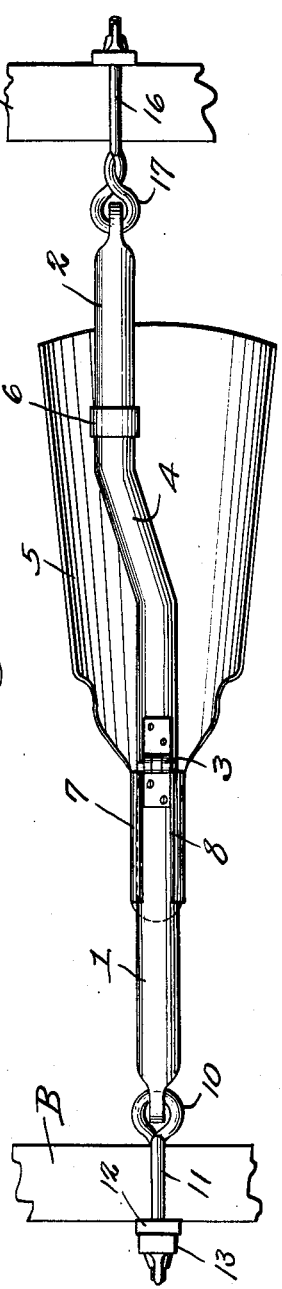
George Weise
INVENTOR.
BY *C. A. Snowles*
ATTORNEYS.

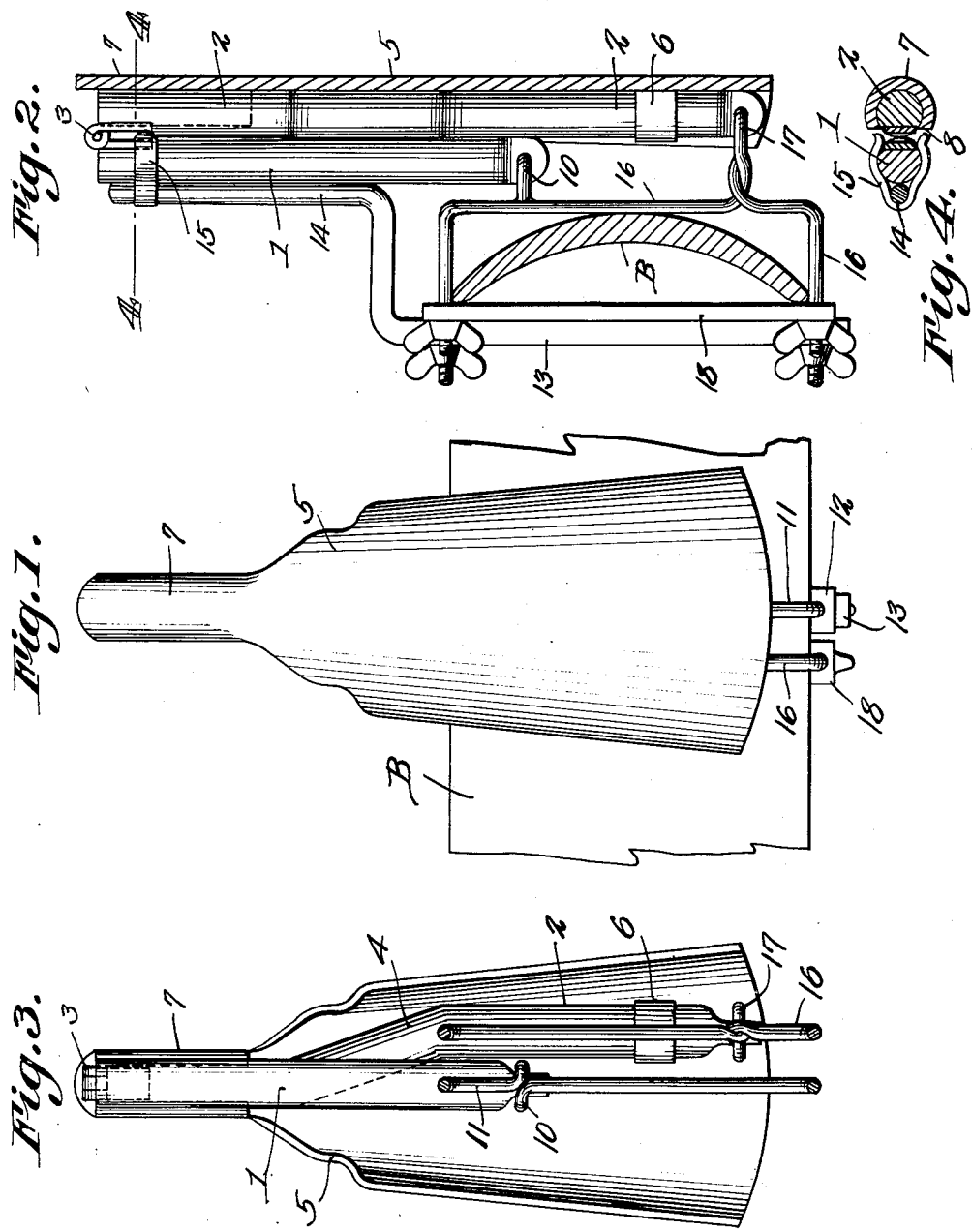

Patented Nov. 7, 1939

2,179,070

UNITED STATES PATENT OFFICE 2,179,070

COLLAPSIBLE TOW BAR

George Weise, New York, N. Y.

Application January 27, 1939, Serial No. 253,186

6 Claims. (Cl. 293—55)

This invention relates to a tow bar for motor vehicles, one of the objects being to provide a bar which, when collapsed and properly positioned on a vehicle, constitutes an efficient bumper guard.

A further object is to provide a device of this character which can be readily converted from a bumper guard into a tow bar and vice versa, as needed.

Another object is to provide a combination tow bar and bumper guard which is easily installed and sufficiently strong to meet all of the requirements both of a tow bar and a bumper guard.

Another object is to provide a device of this character which, when in use as a bumper guard, does not detract from the appearance of the vehicle to which it is attached.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is an elevation of the device set up for use as a bumper guard.

Figure 2 is a side elevation of the device, the guard plate and the bumper being shown in section.

Figure 3 is a rear elevation of the device, the attaching brackets being shown in section and the guard post being removed.

Figure 4 is a section on line 4—4, Figure 2.

Figure 5 is a side elevation showing the device extended for use as a tow bar, the bumpers of connected vehicles being shown in section.

Figure 6 is a bottom plan view of the structure shown in Figure 5.

Referring to the figures by characters of reference 1 and 2 designate bars hingedly connected as at 3 so that these two bars can fold together as shown for example in Figure 2. It is preferred to make the bars tubular and the bar 2 is somewhat longer than the bar 1 and is offset laterally between its ends as indicated at 4.

A guard plate of any desired configuration and preferably bowed transversely has been indicated at 5 and is provided on its concave face with a sleeve 6 slidably engaging one end portion of the bar 3. This guard plate has an extension 7 at one end in the form of a sleeve provided with a longitudinal slot 8 and the parts are so located and proportioned that when the two bars are folded together, as in Figure 2, sleeve 7 embraces the hinge end portion of bar 2. However, when the two bars are swung into position with their ends abutting, as in Figures 5 and 6, sleeve 7 can then be thrust onto bar 1 as shown in said figures, thereby locking the two bars against relative swinging movement.

Bar 1 is pivotally mounted, at 9, on an eye 10 carried by a bracket 11. This bracket can be of any preferred construction and preferably made of a strong rod bent to form a yoke or U-bolt of such proportions as to straddle a bumper B. The ends of the yoke are extended through a clamping plate 12 engaged by the back edges of the bumper and the yoke or U-bolt also serves to bind against the clamping plate 12 the lower end portion 13 of a post 14. This post is offset between its ends so that the upper portion will be substantially in vertical alinement with the intermediate portion of the yoke or U-bolt 11. The upper end of the post is provided with a spring clip 15.

One end of bar 2 is also connected to a U-bolt or yoke 16 similar to the one shown at 11, this bolt having an eye 17 engaging the bar. A clamping plate 18 is attached to the ends of the U-bolt or yoke and cooperates with the intermediate portion of said yoke to bind upon a bumper.

When the device is used as a tow bar the parts are positioned as shown in Figures 5 and 6, yoke 11 being attached to the bumper B of the vehicle to which it is joined as a fixture while yoke 16 is connected to the bumper B' of the towing vehicle. With the parts thus arranged, the guard plate 5 has its extension 7 embracing bar 1 so that the bar will not fold while in use.

When it is desired to collapse the tow bar and use it as a bumper guard, it is disconnected from the bumper B' after the guard plate 5 has been slid toward yoke 16 so as to withdraw the extension 7 from engagement with bar 1. Thereafter the bars are swung relative to each other or folded until brought to the positions shown in Figure 2 whereupon bar 1 will snap into engagement with the clip 15 and be supported in an upstanding position. Yoke 16, in an inverted position, is placed astride the bumper B and fastened thereto as shown. It will be noted that the eye 17 on yoke 16 is located a sufficient distance below eye 10 of yoke 11 to compensate for the difference in length of the two bars.

With the parts thus assembled the bumper plate 5 and its extension 7 will cover the bars so that they cannot be seen from in front of the vehicle as will be apparent by referring to Figure 1.

What is claimed is:

1. A combined bumper guard and tow bar including bars hingedly connected at one end, means carried by the other ends of the bars for attaching them to a bumper, a guard plate mounted on one of the bars for sliding movement, for shielding the bars when folded, and means on the guard plate and cooperating with the other bar for holding the bars against relative movement when unfolded to form a tow bar.

2. A combined bumper guard and tow bar including bars hingedly connected at one end, means connected to the other ends of the bars for attaching them to a single bumper or to the bumpers of spaced vehicles, a guard plate slidably mounted on one of the bars for shielding both bars in one direction when folded together, and means carried by the plate and cooperating with the other bar for holding the bars against relative swinging movement when extended for use as a tow bar.

3. The combination with a bumper, of a combined guard and tow bar including bars hingedly connected at one end, means at the other end of the bars for detachably connecting them to the bumper, a post mounted on the bumper, means carried thereby and cooperating with one of the bars for holding the bars in upstanding position relative to the bumper and while folded, and a guard plate mounted on one of the bars for shielding the bars when folded.

4. The combination with a bumper, of a combined guard and tow bar including bars hingedly connected at one end, means at the other end of the bars for detachably connecting them to the bumper, a post mounted on the bumper, means carried thereby and cooperating with one of the bars for holding the bars in upstanding position relative to the bumper and while folded, and a guard plate mounted on one of the bars for shielding the bars when folded, one of said fastening means being detachable from the bumper for attachment to the bumper of another vehicle when the bars are unfolded, and means on the guard plate for fastening the bars against relative swinging movement when used as a tow bar.

5. A bumper guard comprising hingedly connected members, means for supporting the members in upstanding positions on a bumper, and movable means cooperating with said members for locking them against relative swinging movement when in use as a tow bar.

6. The combination with the bumper of a vehicle and a post upstanding therefrom, of hingedly connected members normally folded together, means for detachably connecting the members in upstanding positions to the post, means on one of the members for attachment to the bumper of a towing car when the members are swung relative to each other for use as a tow bar, and means slidably mounted on one of the members for cooperation with the other member to lock said members against relative swinging movement when used as a tow bar.

GEORGE WEISE.